United States Patent [19]

Oh

[11] Patent Number: 4,971,502

[45] Date of Patent: Nov. 20, 1990

[54] FASTENING BOLT SET

[76] Inventor: Jung H. Oh, 91-265, Shinsu-Dong, Mapo-Ku, Seoul, Rep. of Korea

[21] Appl. No.: 303,354

[22] Filed: Jan. 27, 1989

[51] Int. Cl.5 .............................................. F16B 21/00
[52] U.S. Cl. .................................. 411/340; 411/344; 411/546; 411/386
[58] Field of Search ............................. 411/340–342, 411/344–346, 531, 546, 539, 378, 386; 285/208, 209, 210, 200; 403/11, 12, 403

[56] References Cited

U.S. PATENT DOCUMENTS

| 1,356,404 | 10/1920 | Robinson | 411/546 |
| 1,521,024 | 12/1924 | Hubener | 411/344 |
| 1,542,645 | 6/1925 | Saucke | 285/208 |
| 2,731,065 | 1/1956 | Powers | 411/531 |
| 3,146,010 | 8/1964 | Dellith | 411/539 |
| 3,473,431 | 10/1969 | King | 411/344 |
| 4,637,638 | 1/1987 | Rush | 285/208 |

FOREIGN PATENT DOCUMENTS

| 223792 | 10/1962 | Austria | 411/340 |
| 642986 | 5/1964 | France | 411/340 |
| 382382 | 10/1931 | United Kingdom | 285/209 |
| 480021 | 2/1938 | United Kingdom | 285/208 |

Primary Examiner—Gary L. Smith
Assistant Examiner—F. Saether
Attorney, Agent, or Firm—Donald C. Feix; Thomas M. Freiburger

[57] ABSTRACT

A fastening bolt set is disclosed which is used for attaching an object to a structure, and which comprises an ordinary bolt with a hexagonal or circular head, an internal washer having a long shape and having an annular projection, an external washer having an annular projection, and an ordinary nut for final tightening, all of the above components being connected by a string. This device is used where the back side of the structure is unreachable by hand or by means of a tool, and the working method is such that the bolt and the internal washer are sequentially inserted through the fastening hole, and the string connected to the bolt and the washer is pulled out of the fastening hole. Then the head of the bolt and the internal washer are combined together, the body of the bolt is passed through the fastening hole, and the head of the bolt and the internal washer are halted at the back side of the fastening hole. Then the external washer and the nut are put to the outwardly extended bolt body to finish the fastening by tightening the nut.

6 Claims, 3 Drawing Sheets

FASTENING BOLT SET

BACKGROUND OF THE INVENTION

1. Field of the Invention

The present invention relates to a fastening bolt set which comprises an ordinary bolt, a special type of washer, an ordinary washer, and an ordinary nut, all them being connected by a string, for use in an object, the other side of which can not be reached by hand or by means of a tool, the working principle of the present invention being such that, in the case where the back side of a plate or other kind of object is unreachable, a hole big enough to receive a bolt and the special washer is made in the plate or the object, the bolt and the special washer connected by means of a string are inserted into the said hole, the string is pulled out until the bolt and the special washer are halted at the other side of the object, and then the bolt is fastened by means of an ordinary washer and an ordinary nut.

2. Description of the Prior Art

Korea Patent serial No. 86-6646 which was applied by the present applicant describes a similar device for securing the head of a bolt by means of a special type of washer.

In this prior art, a hole is made in the object to be fastened, and the head of a bolt is inserted into the hole. But in this case, a circular washer is divided into several pieces so as for them to be inserted into the said hole. The divided pieces of the circular washer are provided recesses so that, when the pieces are combined together, they should keep a constant thickness. The head of the bolt is inserted into the hole, and the divided pieces of the washer connected one another by means of a string which is also connected to the bolt are also inserted into the hole sequentially. If the string is pulled out, the divided pieces of the washer is combined forming a circular washer, and because this combined circular washer is larger than the hole, it keeps the head of the bolt from being taken out of the hole, thereby securing the bolt to the object to be fastened. Thus another object can be fastened to the said object. The above device is used in the case where the back side of an object is not reachable by hand or by means of a tool. Therefore the bolt and the divided pieces of the washer are inserted from the front through a hole. But when the string is pulled out, the divided pieces of the washer are not easily combined into a circular washer due to the numerousness of the pieces. Further, it is troublesome to insert the plurality of the pieces of the circular washer into the hole, thereby consuming much time and making the work difficult and inefficient.

The device of this prior invention consists of two or more divided washer sections, through which a guide wire is connected. In this device, each section of the divided washer is passed through the fastening hole to the opposite side of the panel, and then, the two strands of the guide wire are pulled forward in order to make the divided washer sections get together at the head of the bolt. Therefore, this device can not perform the function of a nut, but only the original function of a washer. Further, the fastening strength of this washer is very weak, and therefore, it is liable to fall out from the head of a bolt. In order to prevent such phenomenon, an annular groove is formed on the head of the bolt, while an annular projection is formed on the washer. Further, in order to assure the sure assembling of the washer sections, a plurality of guide holes for the guide wire are required. Such complicated features of the said device pose as the main disadvantage because the manufacturing cost of the device is increased thereby.

As an another prior art, there is a device which comprises a plurality of anchors which are foldable/unfoldable like an umbrella. This device is inserted into a hole, and then, the anchors are made to be unfolded so that the bolt should be halted at the back side of the object. While this device is same in its use as the device of the present invention, its technical conception is quite different from that of the present invention, and therefore, comments on this device will not be made.

SUMMARY OF THE INVENTION

The fastening set of the present invention is used when a structure, the back side of which is not reachable by hand or by means of a tool, is to be attached with an object. In this case, as the bolt can not be inserted from the back side through the hole toward the front, a bolt and a special kind of washer are inserted from the front through the hole toward the back side of the structure.

That is, in order to attach an object to a structure, the back side of which is not reachable by hand or by means of a tool, the fastening set of the present invention comprises an ordinary bolt having a hexagonal head or a round head and the required length for inserting through a hole for attachment of an object to a structure; a special kind of washer, the opposite sides of which are parallely cut off so as for the washer to form a long shape, and so as for the washer to be inserted through the hole but to be halted at the other side of the structure to secure the bolt upon pulling out the string connected to the bolt and the washer; an external washer having a flange and a sleeve for retaining the bolt; a bullet-shaped piece with a string attached thereto and for smoothly guiding the tip of the bolt into the washers; and a nut for performing the final fastening in order to attach an object to a structure. The above-mentioned components connected by means of a string make up one fastening set. First, the bolt with the bullet-shaped piece secured to it and the long parallely cut-off washer are inserted through the fastening hole, and then, the string attached through the washer to the tip of the bullet-shaped piece is pulled out. Then, due to the guiding function of the string, the tip of the bolt is inserted into the parallelly cut-off long washer until the head of the bolt is halted at the face of the washer, and at the same time, the bolt is inserted through the fastening hole from the back to the front until the washer and the head of the bolt are halted at the back face of the structure. Thus the bolt is protruded toward the front long enough so that the external washer and the nut together with the object to be attached can be fastened to the bolt.

BRIEF DESCRIPTION OF THE DRAWINGS

The above constitution and advantages of the present invention will become more apparent by describing the preferred embodiments of the present invention in detail with reference to the attached drawings in which.

DESCRIPTION OF THE PREFERRED EMBODIMENTS

Figure 1:
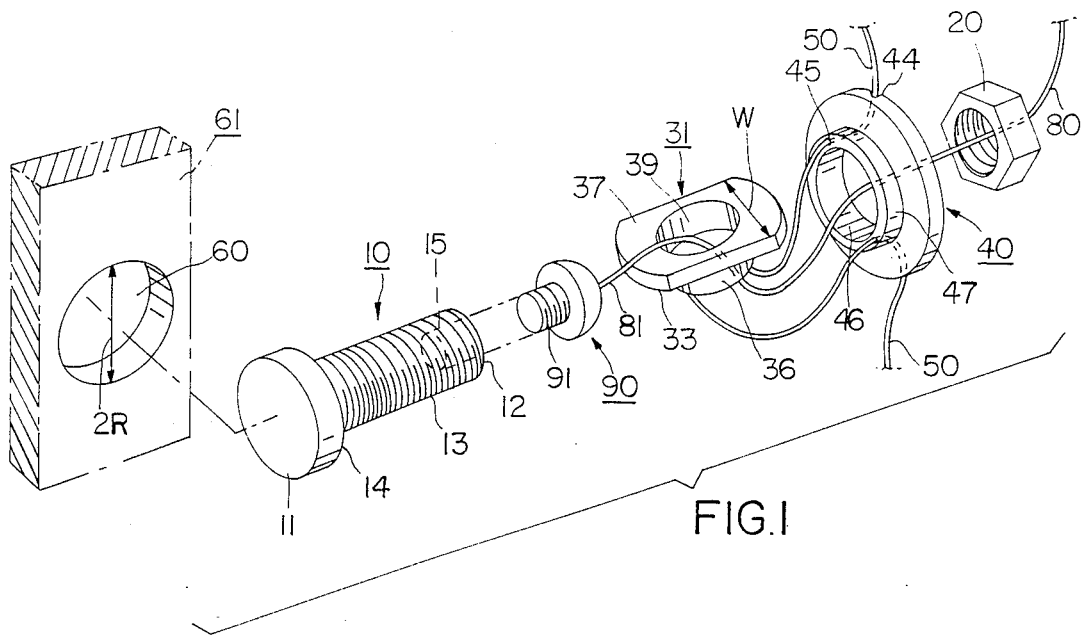
FIG. 1 is an exploded perspective view of the fastening set of the present invention.
Figure 2:
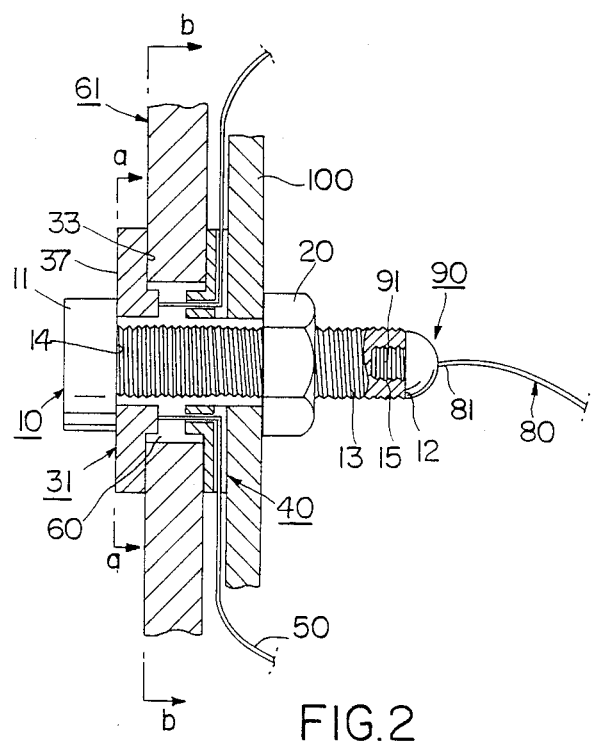
FIG. 2 is a cross sectional view illustrating an examplary case in which the fastening set of the present invention is used to attach an object to a structure.
Figure 3A:
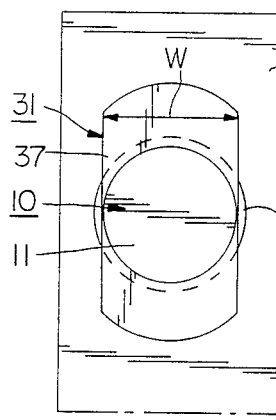
FIG. 3(A) is a rear view of the fastening example of FIG. 2.
Figure 3B:
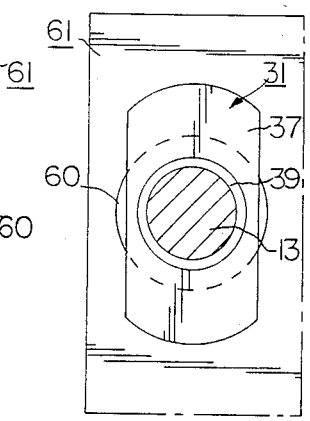
FIG. 3(B) is a sectional view taken along the line a—a of FIG. 2.
Figure 3C:
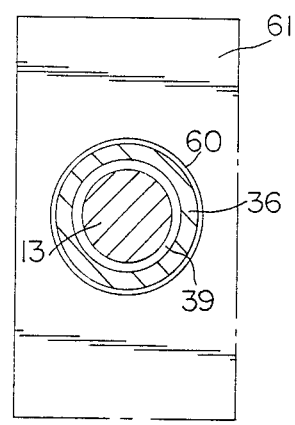
FIG. 3(C) is a sectional view taken along the line b—b of FIG. 2.

FIGS. 1 to 3 show an embodiment of the present invention, which is for use on a flat surface of a structure. A bolt hole 60 is formed through a flat surface of a structure 61, and the bolt hole 60 has a diameter 2R for adequately receiving a head 11 of a bolt 10. The bolt 10 for fastening an object 100 is provided with an ordinary hexagonal or circular head 11, and the bolt 10 has a free end 12 in which a screw hole is formed to receive a bullet-shaped piece 90. The bullet-shaped piece 90 has a screw portion 91 for being treadably coupled to the screw hole. The leading end of the bullet-shaped piece 90 is connected with an end 81 of a string 80 by which the bolt inserted through the hole 60 can be pulled out back through the hole 60. An internal washer 31 is provided in order to halt the head 11 of the bolt 10 at the back side of the hole 60. This internal washer 31 has a narrow and long shape, being made by cutting off parallelly the opposite sides of a circular washer which is much larger than the diameter 2R of the said hole 60. Thus the internal washer 31 after the parallel cuttings should have a width W which is small enough to easily pass through the hole 60. The internal washer 31 is provided with a centre hole 39, and along the circumference of the hole 39, an annular projection 36 is formed in the axial direction in order to facilitate the insertion of the bolt 10. A pair of strings 50, 50 are attached to the sides 33 respectively, so that they can be pulled together with the string 80 through the hole 60. An external washer 40 is provided with an annular projection 47 for facilitating the insertion of the bolt 10, and if desired, a pair of holes 45 can be formed so that the strings 50, 50 can pass through. Further, a pair of slots 44 can be provided at the opposite points of the periphery of the external washer 40, to protect the strings 50, 50; but these are not necessarily required. Finally a nut 20 is provided in order to fasten up the object 100. The above-described components constitute one set of the device of the present invention.

An example of use of this device for fastening an object to a structure is illustrated in FIG. 2.

Now the method of the use of the fastening set according to the present invention will be described. First the bolt 10 and the internal washer 31 are inserted through the hole 60 formed in the structure 61, in such a manner that the inserted components can be pulled out by means of the strings 80, 50, 50. Under this condition, the strings 80, 50, 50 are extended to the outside of the hole 60, and if these strings are properly pulled out, first the bullet-shaped piece 90 secured to the free end of the bolt 10 is guided into the hole 39 of the internal washer 31 due to the pulling force of the string 80, thereby the bolt 10 being engaged into the washer 31. If the string 80 which is attached to the leading end of the bullet-shaped piece 90 is pulled out further, the body of the bolt 10 passes through the hole 60, extending outwardly, until the face 37 of the washer 31 is abutted to the step 14 of the head 11 of the bolt 10, and the other face 33 of the washer 31 is halted at the peripheral portion of the hole 60 of the structure 61. During this process, the annular projection 36 of the internal washer 31 is inserted into the hole 60 of the structure in order to retain the bolt 10 at the correct position. Then in a state in which the body of the bolt 10 is being pulled out by means of the outwardly extended string 80, the external washer 40 and the object to be fastened (100) are sequentially put to the body of the bolt 10. Finally the nut 20 is put to the body of the bolt 10 to threadably fasten the nut 20 to the threaded portion 13 of the bolt body by means of a tool. During this process, the annular projection 47 of the external washer 40 is inserted into the hole 60 of the structure 61 in order to retain the body of the bolt 10 at the correct position perpendicularly to the face of the structure. Ultimately, through the tightening of the nut 20, the object 100 can be firmly attached onto the face of the structure 61.

Meanwhile, in the case where the face of the fastening site is curved, for example, in the case where an object is to be attached on the circumferential surface of a tube, or a nipple with head (to be called nipple herein after) or a socket is to be attached on the same kind of surface, the attachment can be made by means of the same device as the first embodiment of the present invention, differing only in that curved washers are used.

Figure 4:
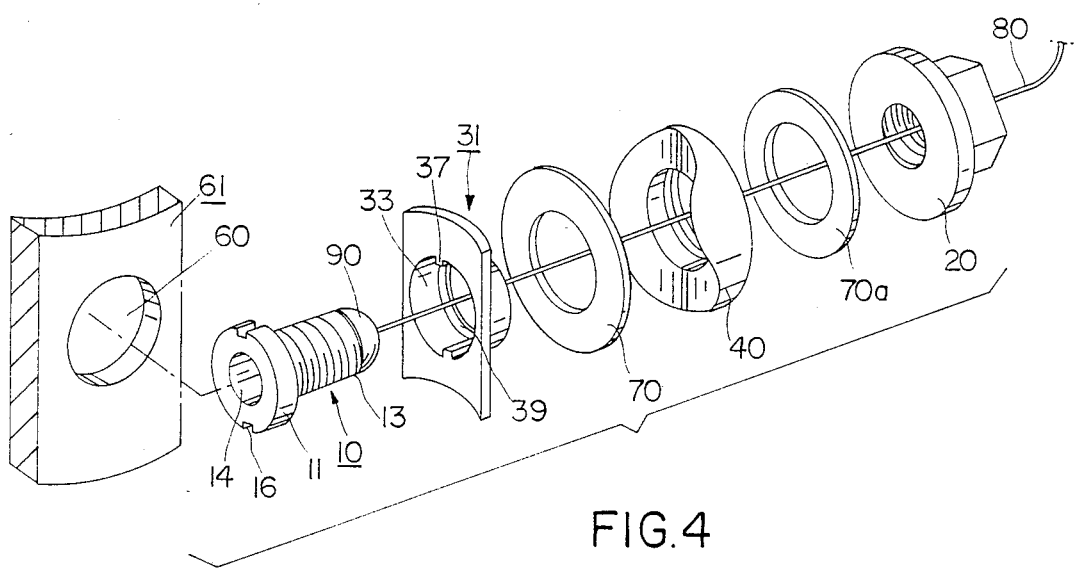
FIG. 4 is an exploded perspective view of an another embodiment of the present invention, which is for use on a curved surface.
Figure 5:
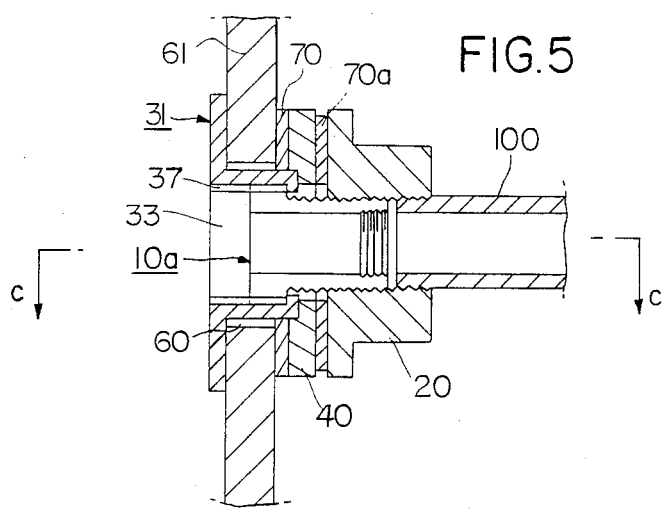
FIG. 5 is a partially cross sectional view illustrating an examplary case in which the second embodiment of the present invention as shown in FIG. 4 is used to attach an object to a curved surface of a structure.
Figure 6A:
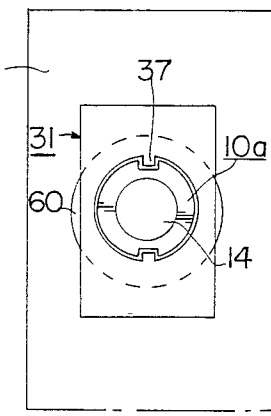
FIG. 6(A) is a rear view of the examplary use of FIG. 5.
Figure 6B:
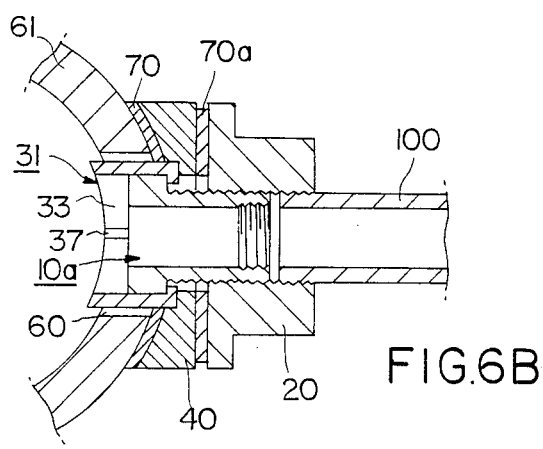
FIG. 6(B) is a sectional view taken along the line c—c of FIG. 5.

FIGS. 4 to 6 illustrate an examplary case where a nipple is fixedly connected to a curved surface of a structure. A structure 61 in the form of a tube has a hole 60 for attachment of a nipple 10a. The periphery of a head 11 of the nipple 10a is provided with groove 16 symmetrically, and the body of the nipple 10a is also provided with a through hole 14 for passing of the liquid or gas which flows through the tube structure. A bullet-shaped piece 90 is attached to the leading end of the nipple 10a, and a string 80 is connected to the tip of the bullet-shaped piece 90 so that the string 80 can be held by hand during insertion of the nipple 10a through the hole 60 of the tube structure 61. After the insertion of the nipple 10a, an internal washer 31 which is also connected by the string 80 is inserted through the hole 60 in the same manner as that of the nipple 10a. (After completion of fastening, the bullet-shaped piece is removed.)

The washer 31 is provided with a centre hole 39, and a cylindrical socket 33 is formed around the hole 39, so that the head 11 of the nipple 10a can be completely inserted into the socket 33, and that the body of the nipple 10a can pass through the centre hole 39. The washer 31 is also provided with a curved surface in such a manner that it should fit to the surface of the tube structure. After the nipple 10a and the internal washer 31 have been inserted, if the string 80 is pulled out of the hole 60, the body of the nipple 10a will go through the hole 39 of the internal washer 31, being guided by the bullet-shaped piece 90, and if the string 80 is pulled out further, the head 11 of the nipple 10a is inserted into the socket 33 which is formed around the hole 39. At this stage, the body of the nipple 10a is extended through the hole 60 of the tube structure 61 to the outside, and therefore, if the body of the nipple 10a is held by hand and is turned to the left and right, the protuberances 37 which are provided on the inner surface of the socket 33 are made to engage with the grooves 16 which are formed on the head 11 of the nipple 10a.

If the body of the nipple 10a held by hand is turned further to the left and right, the washer 31 is turned together with the nipple 10a, and therefore, the internal washer 31 can be adjusted such that the curved surface of the washer 31 should be fit to the curved surface of the tube structure 61. After such proper coupling of the two curved surfaces, the string 80 is kept pulled so that the curved surfaces and the involved components should be closely contacted. Then a packing 70, an external washer 40 which has a curved surface at one side and a flat surface at another side, and another packing 70a are sequentially put to the body of the nipple 10a, and finally, a nut 20 is threadably tightened to the body of the nipple 10a. Thus an intened object can be attached firmly onto the tube structure entirely from the outside.

In using the device of the present invention, if a nipple is to be used on a flat surface, the fastening set of FIG. 1 is used including the nut and the washers, except that the bolt is replaced with a nipple shown in FIG. 4. Meanwhile, if not a tube but an ordinary object is to be attached to a tube structure, the fastening set of FIG. 4 is used including the nut, the washers and the packings, except that the nipple is replaced with a bolt as shown in FIG. 1.

The internal washer according to the present invention is constituted by a single piece which is long and flat, and therefore, when the string is pulled after insertion of the bolt and the internal washer, the bolt and the washer are more easily combined, compared with the case of the prior art in which the internal washer is divided into half or more pieces. Further, as the internal washer of the present invention is constituted by a single piece unlike the case of the prior art, the attachment is kept secure. That is, once a fastening is made, the washers can not displace, thereby firmly keeping the attached object.

Further as the internal washer can be used without the additional strings, the manufacturing cost is saved, and the handling is made simple.

If an object is to be attached to a surface of special shape, the surfaces of the washers to be used should be so made as to be fit to the pertinent surface.

What is claimed is:

1. A fastening bolt set for attachment of an object to a structure, comprising:
    a bolt having a hexagonal or circular head and a threaded shank;
    a bullet-shaped piece threadably fixed to the leading end of the said bolt;
    said bullet shaped piece having a curved outer surface continuous with said threaded shank for smoothly guiding the tip of the bolt into openings in washers associated with the bolt during assembly and attachment of the bolt set to a structure;
    a first string connected to the tip of the bullet-shaped piece;
    said string having a portion which is insertable into a fastening hole of the structure together with the bolt and which portion can be later pulled through the hole to pull the bolt into an operative position within the structure;
    a narrow and long internal washer for halting the head of the bolt at the back side of the fastening hole after insertion into the fastening hole,
    said internal washer having an annular projection fitted within said hole for retaining the bolt securely at a correct position;
    the narrow part of the internal washer being small enough to easily pass through the fastening hole of the structure;
    the center hole of the internal washer being small enough to halt the head of the bolt at the back side of the fastening hole of the structure;
    said internal washer being an integral, continuous, closed circular piece without any notches or openings so that the internal washer can be carried on said portion of the string at any angular inclination of the internal washer without the risk of the washer falling off of said portion of the string;
    an external washer having an annular projection fitted within said hole for retaining the body of the bolt securely at a correct position, the annular projection of the internal washer and the annular projection of the external washer oppositely facing each other after fastening;
    and a nut for final fastening or tightening in order to attach an object to the structure.

2. The fastening bolt set as claimed in claim 1, wherein said bolt comprises an aperture extending axially therethrough, and a pair of grooves formed at opposite positions on the circumference of the head of the bolt.

3. The fastening bolt set as claimed in claim 2, wherein a cylindrical socket is formed around a centre hole of the internal washer, a pair of protuberances are formed on a inner wall of the socket in such a manner that the protuberances engage the grooves of the bolt when fastening, and the internal washer is formed in a curved shape.

4. The fastening bolt set as claimed in claim 2, wherein the external washer is provided with a curved face at one side, and with a flat face at the other side.

5. The fastening bolt set as claimed in claim 2, wherein packings are in between the internal washer and the external washer.

6. The fastening bolt set as claimed in claims 2, wherein the shapes of the internal washer and the external washer match the shape of the surface where the fastening is to be made.

* * * * *